Patented June 26, 1945

2,379,290

UNITED STATES PATENT OFFICE 2,379,290

CHEMICAL MANUFACTURE

Willard L. Finley, Washington, D. C., assignor to Sinclair Refining Company, New York, N. Y., a corporation of Maine No Drawing. Original application September 6, 1941, Serial No. 409,841. Divided and this application March 24, 1943, Serial No. 480,375

1 Claim. (Cl. 260—474)

This invention relates to a new composition of matter or chemical compound and more particularly to the calcium salt of the 1-methyl heptyl ester of salicylic acid commonly called "capryl salicylate." This application is a division of my co-pending application Serial No. 409,841, filed September 6, 1941.

For brevity, my new composition of matter will be referred to herein as "calcium capryl salicylate." However, it is not to be confused with salts in which the metal is attached to the carboxyl radical. It may be graphically represented as follows:

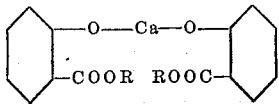

where R represents the 1-methyl heptyl radical or, in other words, the alkyl radical of capryl alcohol.

The calcium capryl salicylate of my present invention may be prepared by reacting the capryl ester of salicylic acid with hydrated lime suspended in a volatile inert solvent such as benzene, naphtha, toluene or the like, at an elevated temperature. The reaction by which the neutral calcium salt of the ester is formed may be graphically represented as follows:

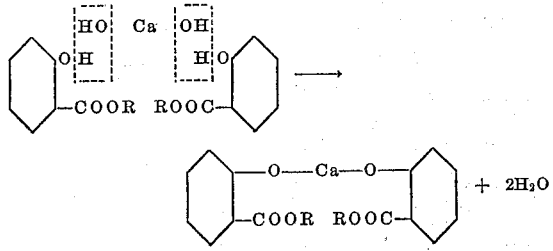

For example, the calcium capryl salicylate in substantially pure form may be prepared by the direct reaction of capryl salicylate with hydrated lime in the presence of a volatile solvent as follows: 60.3 grams of Ca(OH)$_2$ of 92% purity, i. e. 0.75 mole, is suspended in 1200 grams of naphtha by rapid stirring. 375 grams (1.5 moles) of capryl salicylate and 18 c. c. of water are then slowly added. The mixture is held at a temperature of about 160 to 180° F. for about 1 hour and finally heated to about 280° F. to drive off moisture. During this mixing and heating operation, the mixture is rapidly stirred. After the moisture has been driven off, the solution is filtered and finally the solvent is removed from the filtrate by topping to a temperature of 250° F., at an absolute pressure of 1 millimeter of mercury. By this procedure, the calcium capryl salicylate has been obtained as a viscous liquid residue containing 7.60% calcium as compared with the theoretical value of 7.43% calcium for the neutral calcium salt.

The product of my present invention may also be prepared by double-decomposition or methasis by first reacting the ester with sodium hydroxide to form the corresponding sodium salt and reacting the resulting sodium salt with calcium chloride as indicated by the following graphical representation of the reaction:

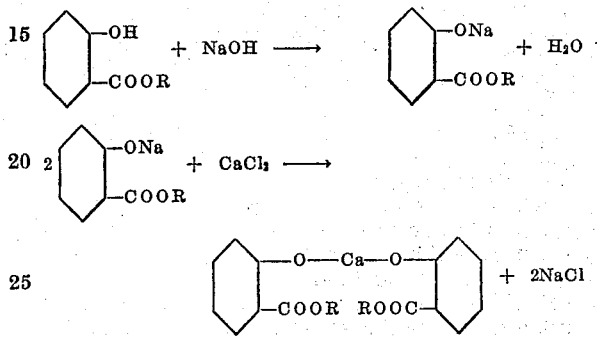

For example, the calcium capryl salicylate may be prepared by methasis as follows: 8.4 grams (.21 mole) of caustic soda of 76% Na$_2$O is dissolved in 25 c. c. of water. This solution is then slowly added to a rapidly stirred solution of 100 c. c. ethyl alcohol and 50 grams (0.20 mole) of capryl salicylate. After a few minutes of rapid stirring, 100 c. c. of benzol and finally 22.2 grams (0.20 mole) of calcium chloride in 40 c. c. of water are slowly added and the stirring continued for 5 minutes. After the cessation of stirring, an upper layer comprising a benzene solution of the calcium capryl salicylate is formed. This upper layer is then separated, filtered and topped under vacuum as indicated in Example I, for the removal of the solvent. By this procedure, a 51 gram yield of the calcium capryl salicylate has been obtained as a viscous liquid containing 7.67% calcium.

As graphically indicated above, 1 mole of sodium hydroxide is required to react with each mole of the ester to form 1 mole of the sodium salt, and 2 moles of the resulting sodium salt are required to react with each mole of the calcium chloride to form the neutral calcium salt of the ester. However, in carrying out the reaction, it is usually desirable to use an excess of sodium hydroxide and of the calcium chloride such as indicated in the foregoing specific example to promote full utilization of the ester and the sodium salt thereof. The proportion of sodium hydroxide and calcium chloride may be varied somewhat. However, I have found proportions approximating those illustrated to give generally satisfactory results.

I have observed that the calcium capryl salicylate of my invention as prepared by either of the foregoing methods, contains slightly more than the theoretical percentage of calcium for the neutral salt. While I cannot state with certainty the reason for the presence of this excess calcium, it is my present belief that it is due to the presence of a small amount of basic calcium capryl salicylate formed during the reaction. This basic salt may be graphically represented as follows:

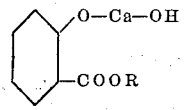

where R represents the alkyl radical of capryl alcohol and wherein only one of the hydroxy radicals of the calcium hydroxide has reacted with the alkyl ester.

In no instance has the excess calcium in the product been in excess of 50% and, in most instances, it has been found to vary between 5 and 20%.

In some instances the presence of such an excess of combined calcium in the product has been found desirable. For example, where used as an addition agent in the compounding of lubricating oils, I have found the calcium capryl salicylate of my present invention, which contains a considerable excess of combined calcium, to be superior in some respects to those which contain more nearly the theoretical amount for the neutral calcium salt.

The amount of combined calcium present in the product in excess of the theoretical amount for neutral calcium capryl salicylate, and which I believe to be due to the presence of the basic calcium capryl salicylate, may be increased by using a greater excess of lime in the process first described, for example equal molar proportions of lime and capryl salicylate may be used.

The product of my present invention is soluble to a considerable extent in mineral oil and has been found to be a particularly valuable addend in the compounding of lubricating oils. Various addition agents have been used for improving certain properties of lubricating oil. Some have been found to stabilize the oil against oxidation or sludging. Other addition agents have been found to inhibit corrosion of the alloy or other metal bearings and parts of the machine to be lubricated, particularly internal combustion engines where operating conditions are especially severe. Other addition agents have been found to increase the film strength of the lubricating oil. Still further addition agents have been found effectively to prevent excessive accumulation of decomposition products on the pistons and rings of internal combustion engines and in altering the nature of such deposits as are formed thereon.

Prior to my discovery of the compound of my present invention, it has frequently been necessary to incorporate in the lubricating oil a plurality of addition agents in order to provide a lubricating oil compound having the properties required for the satisfactory lubrication of internal combustion engines, for instance. Unfortunately, many of the addition agents are incompatible and have been found to interfere with the proper functioning of one another.

I have discovered that the calcium capryl salicylate of my present invention is sufficiently soluble in lubricating oil to permit the solution of effective amounts in the oil and that, when used in small amounts as addition agents in the compounding of lubricating oil, it functions as a strong anti-oxidant, effectively inhibiting for prolonged induction periods the rate of oxygen absorption at elevated temperatures and thus limiting any corrosive tendency of the lubricating oil composition with respect to bearing metals. It has also been found to render deposits of sludge and "carbon" within the engine soft and friable rather than hard and coherent and to act as a solvent for sludge formed, thus disintegrating and removing any deposits of sludge and "carbon" as are incident to normal engine operation.

The use of various calcium alkyl salicylates, including calcium capryl salicylates, as addition agents in lubricating oil compounds is described and claimed in my co-pending applications Serial No. 368,992, filed December 7, 1940, Serial No. 407,002, filed August 15, 1941, and Serial No. 417,471, filed November 1, 1941.

Where the product of my present invention is to be used as an addition agent in the compounding of lubricating oils, it has with advantage been prepared by direct reaction between capryl salicylate and hydrated lime in an oil medium, for example, as follows: 2575 grams of S. A. E. 30 lubricating oil was placed in a 2-gallon reactor equipped with a heater and an efficient stirring mechanism. 222 grams (3 moles) of calcium hydroxide was evenly dispersed in the oil by rapid stirring and then 750 grams (3 moles) of capryl salicylate and 37.5 grams of water were slowly added and stirred into the mixture. Stirring was continued and the mixture maintained at a temperature of about 160–180° F. for 1 hour. Thereafter, the temperature was slowly raised over a period of 1 hour to 280° F. to drive off moisture added and formed in the reaction. The resulting hot calcium capryl salicylate solution is then filtered to remove excess lime. Oil filtrates prepared by this procedure were found to contain 2.25% calcium as calcium capryl salicylate which, consistent with the examples previously given, exceeds the theoretical amount for the neutral salt, i. e. 1.79% calcium for a 24% solution. This excess is believed to be due to the presence of basic calcium capryl salicylate, as previously noted.

I claim:

As a composition of matter, the calcium salt of 1-methyl heptyl salicylate.

WILLARD L. FINLEY.